US012611781B2

(12) United States Patent
Almarkhi et al.

(10) Patent No.: US 12,611,781 B2
(45) Date of Patent: Apr. 28, 2026

(54) MANUFACTURING OVERHEAD PHOTOGRAMMETRY GUIDANCE SYSTEM FOR ROBOTIC BASED FORMATION AND INSPECTION OF WORKPIECE FEATURES

(71) Applicant: GM GLOBAL TECHNOLOGY OPERATIONS LLC, Detroit, MI (US)

(72) Inventors: Ahmad Almarkhi, Farmington Hills, MI (US); Chris A. Ihrke, Hartland, MI (US); John Patrick Spicer, Plymouth, MI (US); Miguel Arturo Saez, Clarkston, MI (US); Michael Bourgeois, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 378 days.

(21) Appl. No.: 18/358,536

(22) Filed: Jul. 25, 2023

(65) Prior Publication Data

US 2025/0033215 A1     Jan. 30, 2025

(51) Int. Cl.
  *B25J 9/16*         (2006.01)
  *B25J 11/00*        (2006.01)
  (Continued)

(52) U.S. Cl.
  CPC ........... B25J 9/1697 (2013.01); B25J 9/1682 (2013.01); B25J 11/0055 (2013.01); B25J 19/023 (2013.01); G01C 11/02 (2013.01)

(58) Field of Classification Search
  CPC .... B25J 9/1682; B25J 11/0055; B25J 9/1697; B25J 19/023; G01C 11/02; G05B 19/41875
  See application file for complete search history.

(56) References Cited

U.S. PATENT DOCUMENTS

| 6,167,607 B1 * | 1/2001 | Pryor | ..................... B25J 19/021 29/702 |
| 2009/0240372 A1 * | 9/2009 | Bordyn | .................. B25J 9/1692 901/14 |
| 2022/0176564 A1 * | 6/2022 | Saez | ................ G05B 19/41805 |

FOREIGN PATENT DOCUMENTS

| DE | 202004017881 U1 | 3/2006 |
| DE | 10026711 B4 | 4/2007 |

(Continued)

OTHER PUBLICATIONS

Office Action dated Apr. 23, 2024 from German Patent Office for German Patent No. 102023128153.4; 6pgs.

(Continued)

*Primary Examiner* — Jennifer Bahls

(57) ABSTRACT

A manufacturing system includes: stability targets; a set of rails; robots including photogrammetry targets mounted on heads of the robots, the robots move along the set of rails, and each of the robots including a plasma cutting tool or a camera mounted on one of the heads; and a photogrammetry system. The photogrammetry system includes: a support stand; overhead cameras mounted on the support stand above the robots and a workpiece to be worked on by one of the robots; and a control module. The control module: via the overhead cameras, determines locations of the stability targets and photogrammetry targets; based on the locations of the stability targets and photogrammetry targets, determines locations of the overhead cameras and heads of the robots; and controls the robots to create and inspect a feature on the workpiece based on the locations of the overhead cameras and heads of the robots.

20 Claims, 9 Drawing Sheets

(51) Int. Cl.
    *B25J 19/02*       (2006.01)
    *G01C 11/02*      (2006.01)

(56)            References Cited

FOREIGN PATENT DOCUMENTS

| DE | 102015204796 A1 | 9/2016 |
| DE | 102019114070 B4 | 12/2020 |
| DE | 102021114598 B4 | 3/2023 |
| FR | 2905888 B1 | 11/2008 |

OTHER PUBLICATIONS

U.S. Appl. No. 17/943,644, filed Sep. 13, 2022, Saez et al.
U.S. Appl. No. 18/326,269, filed May 31, 2023, Ihrke et al.

* cited by examiner

MANUFACTURING OVERHEAD PHOTOGRAMMETRY GUIDANCE SYSTEM FOR ROBOTIC BASED FORMATION AND INSPECTION OF WORKPIECE FEATURES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to manufacturing of products, and more particularly to robotic based feature formation and inspection of workpieces of the products.

Materials, such as aluminum, steel, plastic, etc. are used during manufacturing of a vehicle. Vehicle components (or parts) are manufactured using, for example, stamping, pressing, molding, and cutting machines. Examples of such parts include vehicle frames, doors, hoods, roofs, trunk lids, etc.

Vehicles are often assembled along an assembly line. Components of a vehicle and the vehicle itself can be assembled at stations of the assembly line. This can include forming features and attaching and/or connecting components using various techniques such as cutting, welding, fastening, and/or adhering processes. Detailing operations can also be performed including cleaning, applying corrosion and/or scratch protection layers, painting, etc.

SUMMARY

A manufacturing system is provided and includes: stability targets; a set of rails; robots including photogrammetry targets mounted respectively on heads of the robots, the robots configured to move along the set of rails, and each of the robots including a cutting tool and a camera mounted on a respective one of the heads; and a photogrammetry system. The photogrammetry system includes: a support stand; overhead cameras mounted on the support stand above the robots and a workpiece to be worked on by at least one of the robots; and at least one control module. The control module is configured to: via the overhead cameras, determine locations of the stability targets and locations of the photogrammetry targets; based on the locations of the stability targets and locations of the photogrammetry targets, determine locations of the overhead cameras and locations of the heads of the robots; and control the robots to create and inspect at least one of feature on the workpiece based on the locations of the overhead cameras and the locations of the heads of the robots.

In other features, the robots include: at least one working robot configured to form or work on the at least one feature; and at least one measurement robot configured to inspect the at least one feature.

In other features, each of the stability targets is in field-of-views of at least two of the overhead cameras.

In other features, each of the photogrammetry targets is in field-of-views of at least two of the overhead cameras.

In other features, at least two emitters of each of the stability targets is in field-of-views of at least two of the overhead cameras.

In other features, at least one of: emitters of at least one of the photogrammetry targets is in field-of-views of at least two of the overhead cameras; and at least two emitters of each of the photogrammetry targets is in field-of-views of at least two of the overhead cameras.

In other features, each feature of the workpiece to be at least one of worked on or inspected is within a predetermined range of two of the overhead cameras.

In other features, an intersection angle of each of the stability targets and each of the photogrammetry targets with respect to at least two of the overhead cameras is within a predetermined range.

In other features, the at least one control module is configured to determine locations of the stability targets and locations of the photogrammetry targets based on one or more reference coordinate frames.

In other features, the at least one control module is configured to determine locations of the overhead cameras and locations of the heads of the robots based on one or more reference coordinate frames.

In other features, a manufacturing system design method is provided and includes: defining a workpiece family including dimensions of workpieces of the workpiece family to be worked on; determining feature locations and workpiece orientations for features of the workpieces to be created or worked on based on the dimensions of the workpieces; based on the feature locations, determining locations of a plasma cutting tool of a working robot and corresponding first photogrammetry target at each pre-position of the plasma cutting tool and while in each active working position of the plasma cutting tool associated with creating or working on the features; determining locations of a second photogrammetry target on a measurement robot to determine locations of a measurement robot camera at each pre-position and at each measurement position of the features; and determining number of overhead cameras of an overhead photogrammetry guidance system and locations of the overhead cameras based on first parameters. The method further includes: determining dimensions of an overhead structure holding the overhead cameras based on second parameters; determining a number of stability targets and locations of the stability targets based on third parameters; and create and inspect at least one of the features on one of the workpieces based on i) the locations of the plasma cutting tool, ii) the locations of the measurement robot cameras, iii) the dimensions of the overhead structure, iv) the locations and orientations of the overhead cameras, and v) the locations of the stability targets.

In other features, the determining of the locations of the measurement robot camera at each pre-position and at each measurement position includes determining each pre-position and each measurement position of i) datums of the workpieces, ii) ones of the features worked on and measured, and iii) ones of the features measured but not worked on.

In other features, the first parameters include i) the dimensions of the workpieces, ii) the feature locations, iii) the locations of the first photogrammetry target, iv) the second photogrammetry target, and v) the locations of the measurement robot camera.

In other features, the second parameters include i) the locations of the first photogrammetry target and the second photogrammetry target, ii) the locations of the measurement robot camera, iii) the number of the overhead cameras, and iv) the locations and orientations of the overhead cameras.

In other features, the third parameters include i) the number of the overhead cameras, and ii) the locations of the overhead cameras.

In other features, the at least one of working on and inspecting the features of the one of the workpieces includes: calibrating the overhead photogrammetry guidance system; calibrating the working robot and the measurement robot; moving one of the workpieces into a cell having the overhead photogrammetry guidance system to create or work on the features of the one of the workpieces; orienting the one of the workpieces and determining locations of datums of the one of the workpieces; guiding the plasma cutting tool to work on features of the one of the workpieces; and guiding the measurement robot camera to inspect the features on the one of the workpieces.

In other features, the calibrating of the overhead photogrammetry guidance system includes determining locations of the overhead cameras relative to the stability targets.

In other features, the calibrating of the working robot and the measurement robot includes determining locations of the first photogrammetry target and the second photogrammetry target relative to the overhead cameras.

In other features, the plasma cutting tool is guided based on known locations of the first photogrammetry target relative to the overhead cameras.

In other features, the measurement robot camera is guided based on known locations of the second photogrammetry target relative to the overhead cameras.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some products are produced in small quantities. For example, certain large heavy-duty trucks can have low-production numbers, such that the trucks and/or portions thereof are manufactured in one or more cells. A cell refers to a three-dimensional (3D) space (or room) in which at least a portion of a vehicle is located during manufacturing. The portion of the vehicle is not moved while in the cell, other than to be reoriented. A cell is typically not part of an assembly line. At least a portion of the vehicle is formed and/or assembled in the cell. For example, a structural frame of a heavy-duty truck can be moved into a cell and worked on to create features on the structural frame. The features can include holes, slots, grooves, etc.

A cell can include working robots and inspecting robots. The working robots can have tools attached to heads of the robots for cutting, drilling, coating, and/or performing other feature forming and/or modifying operation. The inspecting robots can include cameras attached to heads of the robots for inspecting features created. Accuracy of the working and inspecting robots can be limited. As an example, a robot can position a tip of a tool or an inspection camera to be within ±2 millimeters of a target position. This accuracy can be negatively affected due to changes in temperature, wear and tear of robot components over time, etc. Also, the longer the distance between a base of a robot and a head of a robot and/or the more joints and segments (or links) of the robot, the more potential error exists in positioning the head of the robot.

The examples disclosed herein provide an overhead photogrammetry guidance system for improved robot head positioning accuracy and positioning accuracy of items attached to the robot heads, such as tools and cameras. The tools may include cutting tools such as plasma torches (or plasma cutting tools), welding tools, fastening tools, etc. A corresponding method of designing the overhead photogrammetry guidance system is also disclosed. The overhead photogrammetry guidance system reduces robot head positioning error to be less than ±1 mm such that a tip of a tool and/or an inspection camera can be positioned to be within ±1 mm of a target location. In an embodiment, the accuracy is such that positioning error is less than ±0.5 mm.

Figure 1:
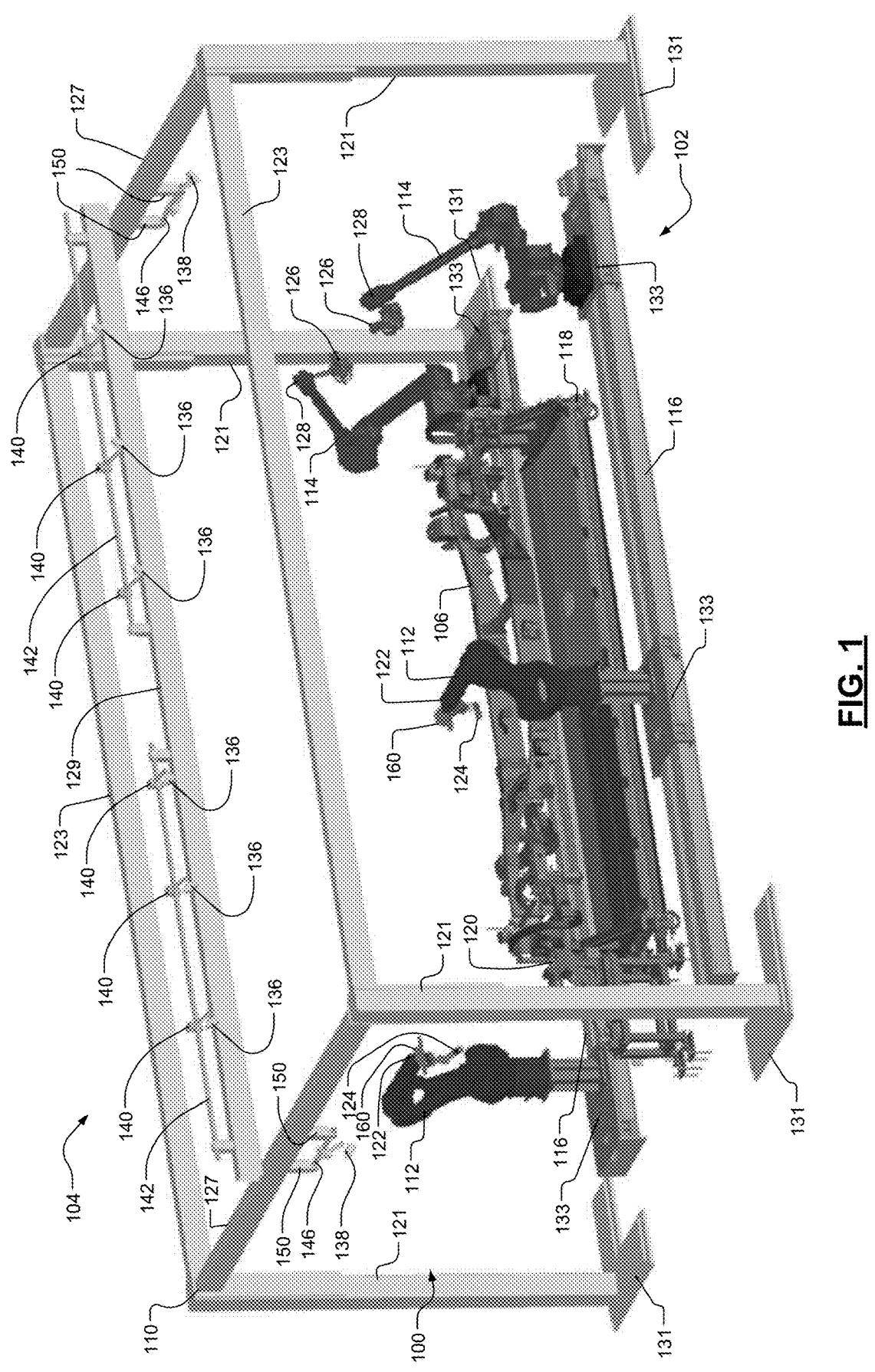
FIG. 1 is a perspective view of an example cell of a manufacturing system including an overhead photogrammetry guidance system in accordance with the present disclosure.
Figure 2:
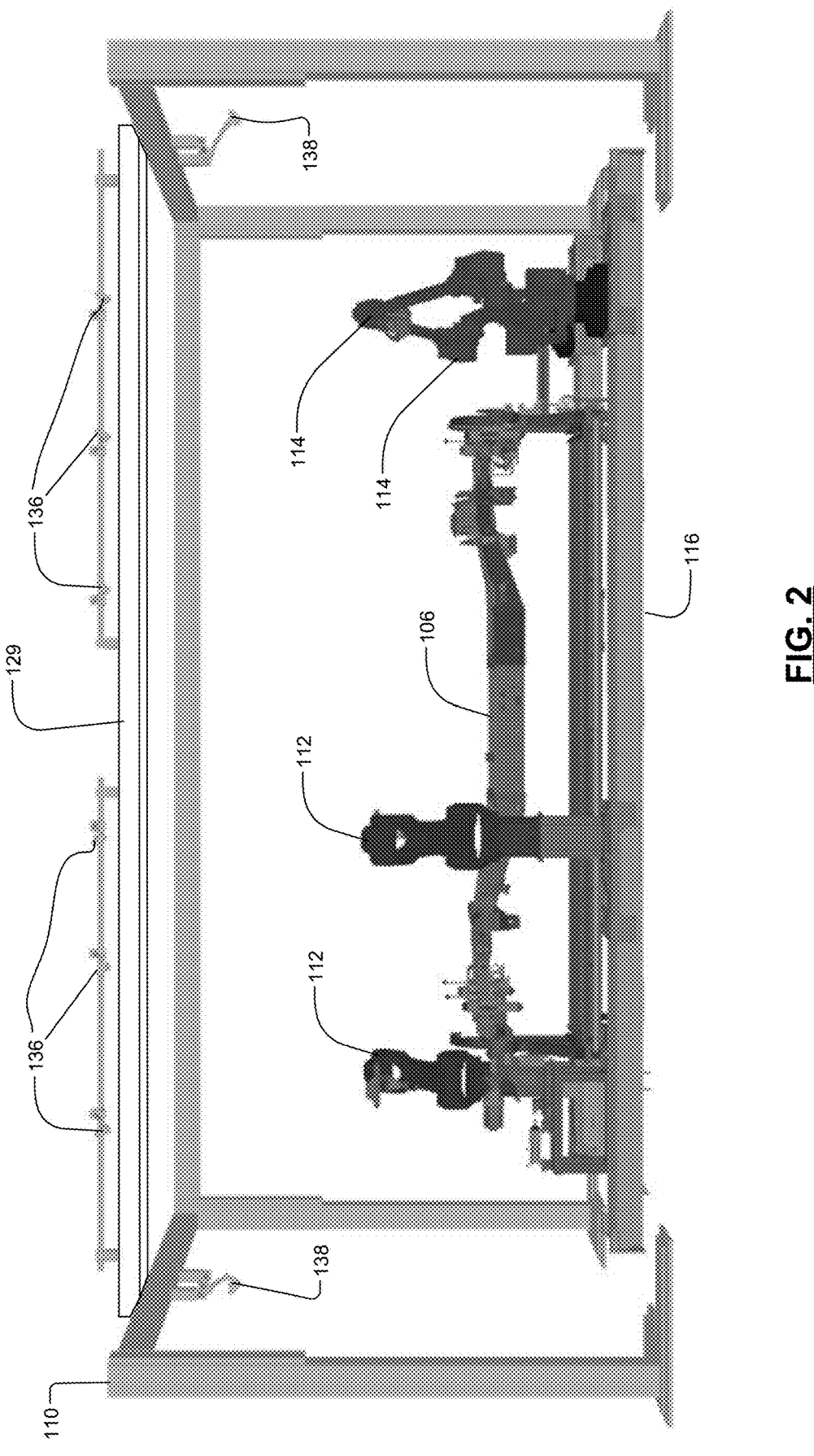
FIG. 2 is a side view of the cell of FIG. 1.
Figure 3:
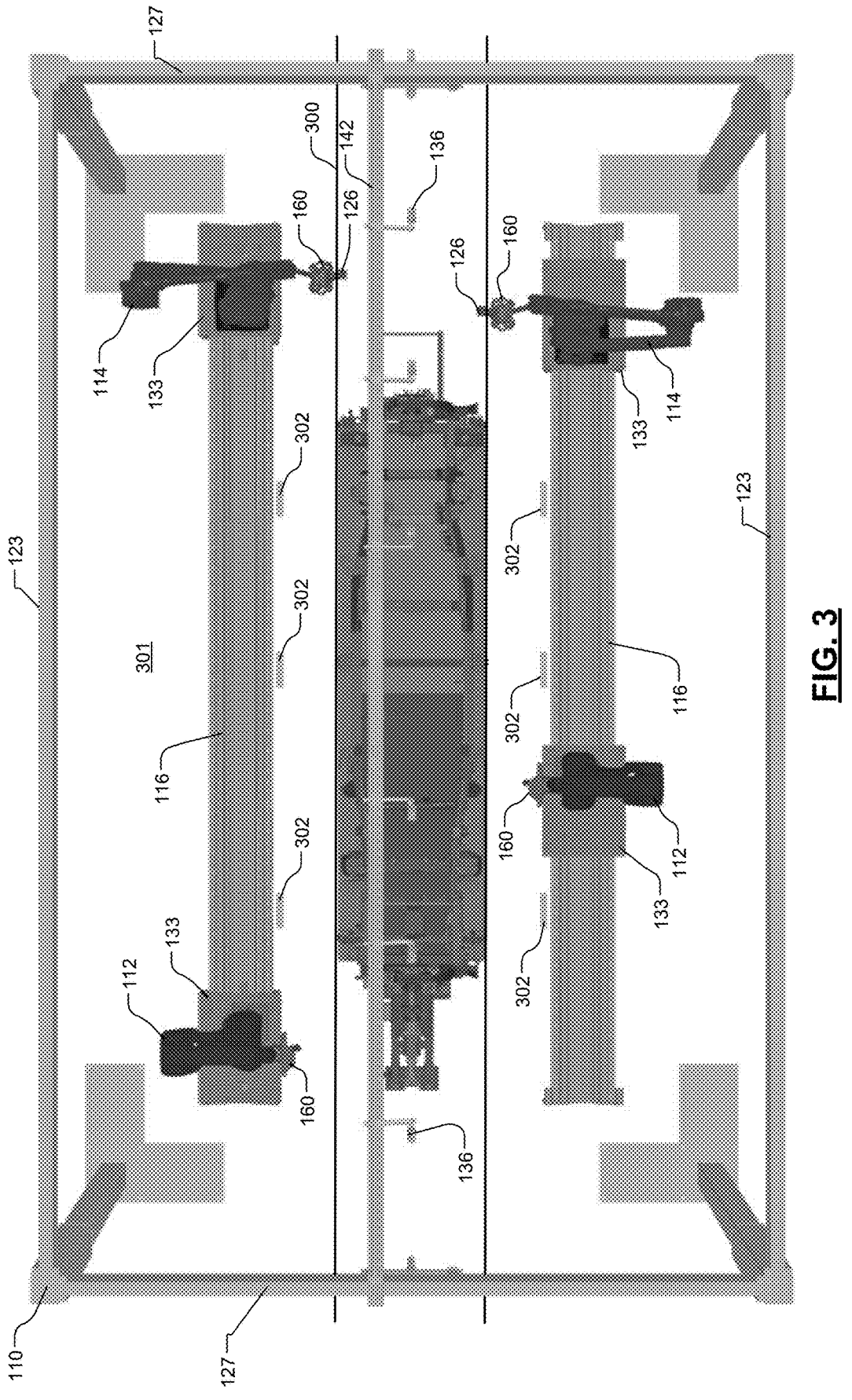
FIG. 3 is a top view of the cell of FIG. 1.

FIGS. 1-3 show a cell 100 of a manufacturing system 102 including an overhead photogrammetry guidance system 104. The cell 100 refers to a three-dimensional (3D) volume in which at least a portion of a product is worked on, the product being referred to as a workpiece. In the example shown, the workpiece 106 is shown and is a large truck frame. The cell 100 may be used for manufacturing a product, such as vehicle, or a portion thereof. The cell 100 may be a station in a series of stations that are used to manufacture the product.

The manufacturing system 102 includes a support stand 110, working robots 112, inspecting (or measurement) robots 114, rail sets 116, and a cart 118 on which the workpiece 106 is mounted. The workpiece 106 is moved into the cell 100 via the cart 118 and is slid between the rail sets 116 to be centered within the cell 100 as shown. The cart 118 may move along a track 300 in the floor (designated 301) that is linear and extends longitudinally and parallel to the rail sets 116. The cart 118 includes a trunnion system 120 that is able to rotate the workpiece 106 about a longitudinal axis of the workpiece 106. The trunnion system 120 may include a motor for rotating the workpiece 106. The cart 118 may have motors for moving the cart 118 relative to the rail sets 116 or the cart 118 may be manually moved relative to the rail sets 116.

The support stand 110 includes legs 121 and crossbars 123, 127 and 129. The legs 121 are attached to feet 131, which are fastened to the floor of the cell. The legs 121 and crossbars 123, 127 and 129 may be hollow and filled with a dampening material, such as sand, pellets and/or other dampening material. In an embodiment, the legs 121 and crossbars 123, 127 and 129 are formed of steel, but may be formed of other materials. In an embodiment, the support stand 110 is constructed to be heavy and rigidly mounted to the floor. The feet 131 may be fastened and/or adhered to the floor. The support stand 110 is constructed to prevent movement of overhead cameras and to minimize and/or prevent vibration of the overhead cameras. In an embodiment, the floor is made as one single slab of concrete that spans an entire space underneath the workpiece 106, robots 112, 114, rail sets 116, and support stand 110. This minimizes: relative movement between the stability targets 302 that are mounted on the floor; distortions in the support stand 110; and ensures greater overall accuracy of the overhead photogrammetry guidance system 104. In an embodiment, the concrete slab has a minimum thickness of 8 inches (200 mm) of reinforced concrete with no cuts or expansion joints contained therein.

The working robots 112 work on the workpiece 106. This may include performing operations such as cutting, drilling, welding, fastening, and/or other operations. The working robots 112 have tools (e.g., any of the tools referred to herein) mounted onto heads 122 of the robots 112. As an example, the working robots 112 are shown having torches 124 mounted on the heads 122 of the robots 112. The inspecting robots 114 have cameras 126 mounted onto heads 128 of the robots 114. The cameras 126 are used to inspect features created by the working robots 112 on the workpiece 106, such as holes, slots, welds, installed fasteners and/or other objects, etc. In the example shown, one working robot and one inspection robot are mounted on a respective pair of rails. Each of the rail sets 116 includes a pair of rails, as shown. The robots 112, 114 have bases 133 that move longitudinally along the rail sets 116. The robots 112, 114 are configured such that the heads 128 have 6 degrees of freedom (DOF) movement about respective axes. Each of the robots 112, 114 may include 6 joints and 6 links, where the head of the robot is connected to the $6^{th}$ link. The rail sets 116 provide a $7^{th}$ axis of movement for each of the heads 128.

The overhead photogrammetry guidance system 104 is used for workpiece alignment and guidance of robots 112, 114. The overhead photogrammetry guidance system 104 includes the overhead cameras, which include top mounted cameras 136 and end hanging cameras 138. Top mounted meaning connected to a top crossbar. The overhead cameras may be manually mounted in fixed positions or may be moved via motors, represented by boxes 140. The top mounted cameras 136 may be mounted to and move along rails 142 that extend longitudinally along the crossbar 129 that extends from a front end of the cell 100 to a back end of the cell 100. The rails 142 extend parallel to and may be offset from the crossbar 129. The end hanging cameras 138 may be mounted to and move along rails 146 that hang from crossbars 127 via coupling members 150, which extend vertically. The horizontal and vertical locations of the overhead cameras may be adjusted to provide lines-of-sight between the overhead cameras and features, such as holes, body mounts, slots, and other features of various dimensions. The crossbars 127 extend laterally across the cell 100 perpendicular to the crossbar 129. The rails 146 extend parallel to the crossbars 127.

The overhead cameras 136, 138 detect locations of stability (or calibration) targets 302 and photogrammetry targets (or navigation targets) 160. The stability targets 302 may be mounted on a floor of the cell 100 and are in fixed locations within the cell 100. Although 6 stability targets are shown, any number of stability targets may be used. The number of stability targets used is dependent on the number of overhead cameras and the FOVs of the overhead cameras.

Figure 5:
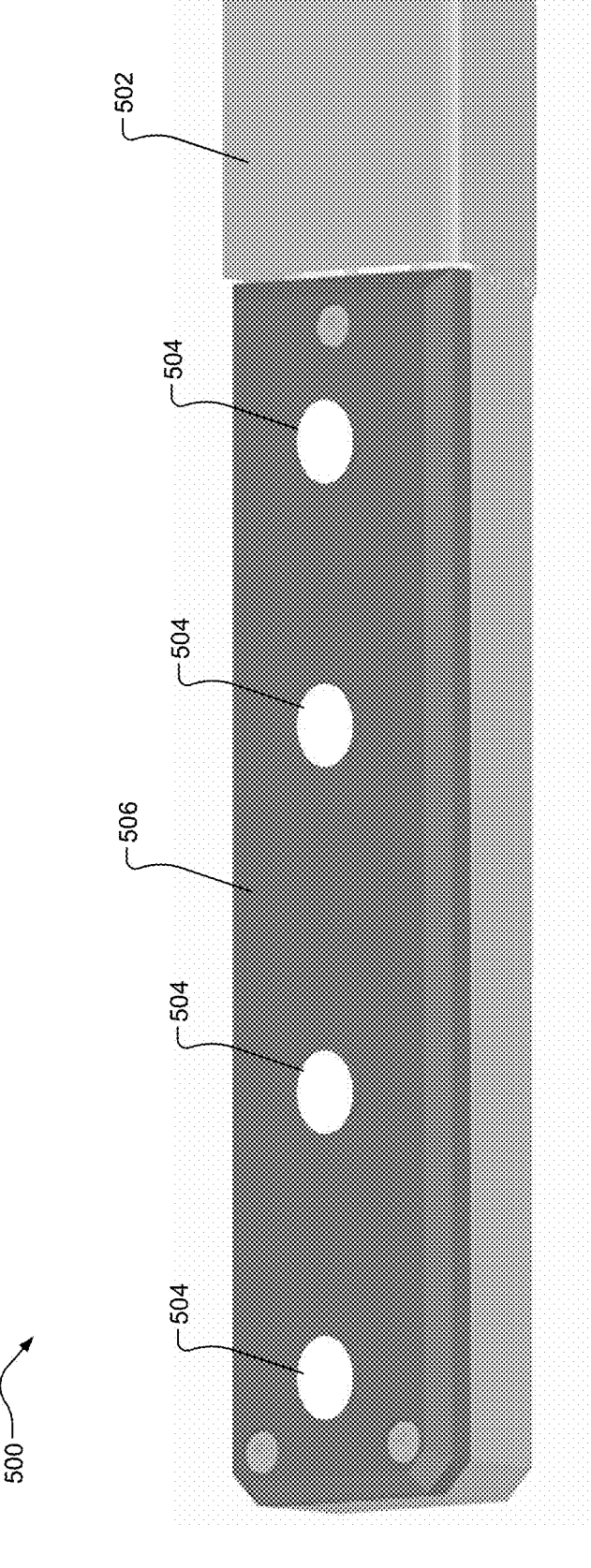
FIG. 5 is a perspective view of an example stability target in accordance with the present disclosure.
Figure 6:
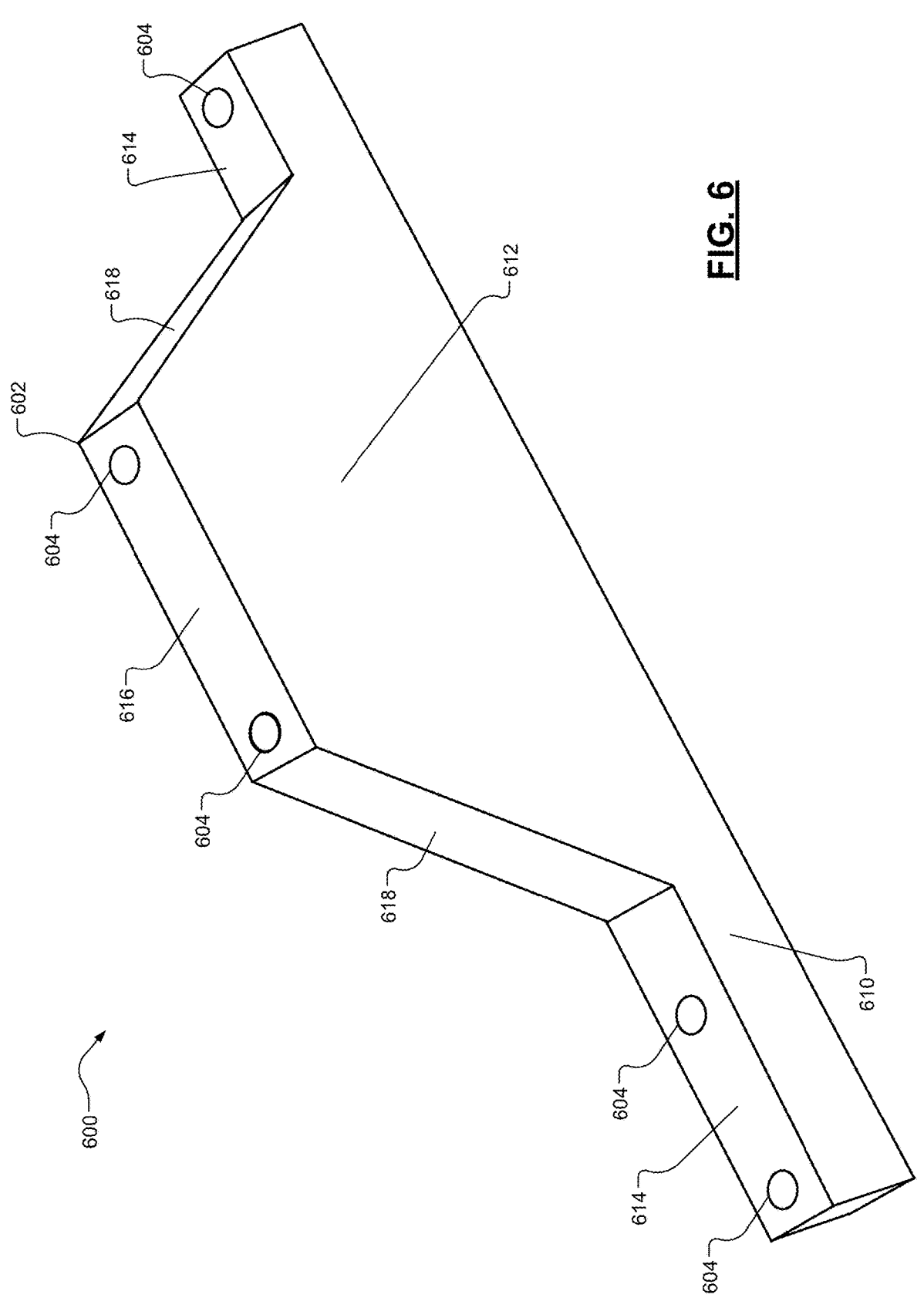
FIG. 6 is a perspective view of an example photogrammetry target in accordance with the present disclosure.

In an embodiment, there is at least one stability target in the FOV of each overhead camera. In another embodiment, there is at least two stability targets in the FOV of each overhead camera. The photogrammetry targets 160 are mounted to the heads 122, 128 of the robots 112, 114. Examples of the targets 302, 160 are shown in FIGS. 5-6. The overhead cameras 136, 138 monitor movement of the photogrammetry targets 160 and are used to track locations of the tools (e.g., the torches 124) and cameras (e.g., the cameras 126) mounted on the robots 112, 114. The cameras 126 are used to detect datums on the workpiece 106 and track and inspect features and surfaces of the workpiece 106. The overhead cameras 136, 138 may also be used to determine locations of features and surfaces of the workpiece 106.

Figure 4:
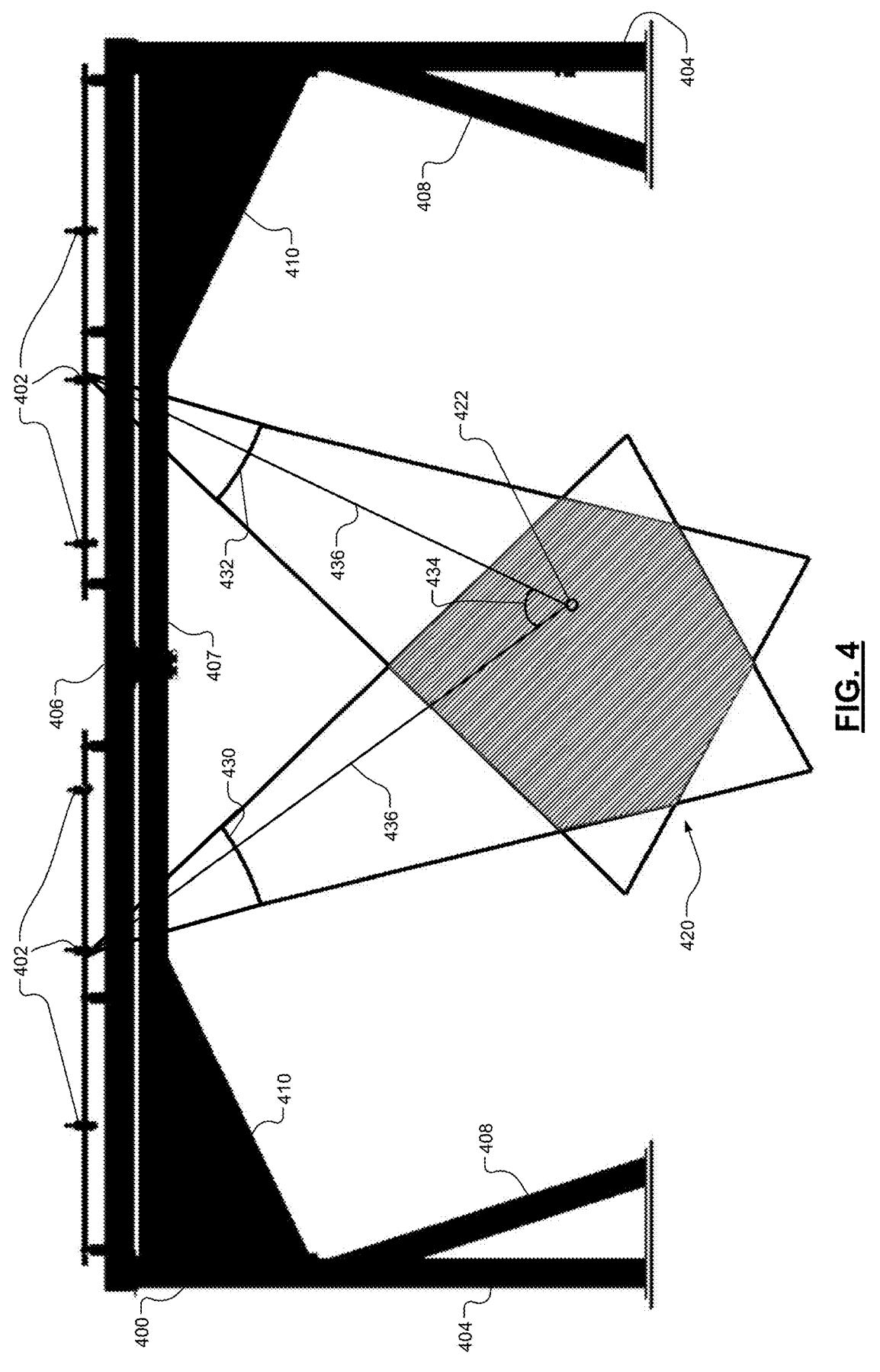
FIG. 4 is a side view of a support stand for overhead cameras of an overhead photogrammetry guidance system illustrating an overlapping field-of-view (FOV) of two overhead cameras in accordance with the present disclosure.

FIG. 4 shows a support stand 400 for overhead cameras 402 of an overhead photogrammetry guidance system such as the photogrammetry guidance system 104 of FIGS. 1-3. The support stand 400 is another example support stand that may be used in replacement of the support stand 110 of FIGS. 1-3. The overhead cameras 402 are similar to the overhead cameras 136 of FIGS. 1-3. The support stand 400 includes vertical legs 404, a crossbar 406 and crossbars 407 (one is shown). Angled support legs 408 are connected to the vertical legs 404. Angled support plates 410 are connected to upper portions of the vertical legs 404 and the crossbars 407. Angled support plates may also be included and attached to lateral crossbars not shown in FIG. 4 but arranged similar to angled support plates 410 and attached to lateral extending crossbars similar to the crossbars 127 of FIGS. 1 and 3.

In FIG. 4 an example overlapping FOV 420 of two of the overhead cameras 402 is shown. The photogrammetry guidance system is configured such that, at any moment in time, at least two of the overhead cameras is able to see each stability target and each photogrammetry target in the corresponding cell. In other words, each target is seen at any moment in time of a manufacturing process by at least two of the overhead cameras. The targets may be seen by different ones of the overhead cameras. This is done such that the locations of each of the stability targets and photogrammetry targets are able to be determined at any moment in time. As an example, the photogrammetry system may use triangulation to determine the locations of each of the stability targets and photogrammetry targets. An example target 422 is shown and may represent a photogrammetry target. Each of the cameras has a FOV angle, two of which are designated 430, 432 for two of the cameras 402. An example FOV intersection angle 434 for the target 422 is shown and refers to an angle between two lines 436 extending from centers of the cameras and intersecting at a point on the target 422, where the target 422 is in the overlapping FOV 420. In an embodiment, the minimum intersection angle is 35° and the maximum intersection angle is 90°. In an embodiment, the FOV of each of the overhead cameras 402 and other overhead cameras (not shown in FIG. 4), such as the hanging overhead cameras 138 of FIGS. 1-3, is 45-90°. In an embodiment, the photogrammetry system is configured such that at any moment in time a distance between each of the overhead cameras 402 and at least one of the targets is 1.5-6.0 meters (m).

FIG. 5 shows a stability target 500 having a body 502 with emitters (or artifacts) 504. The body 502 may be of any shape and size and include any number of emitters. In an embodiment, the emitters 504 include light-emitting diodes (LEDs). The body 502 includes two or more emitters. In an embodiment, the body 502 has 4 emitters (e.g., 4 LEDs). The emitters 504 may be arranged in a row or linear pattern as shown, or may be arranged in a non-linear pattern. Although shown in a same plane extending parallel to a top surface 506 of the body 502, the emitters 504 may be offset from each other such that the emitters 504 are not in a same plane extending parallel to the top surface 506. The emitters 504 may be arranged in various different patterns. In an embodiment, each of the emitters 504 has a ±60° conically-shaped emission pattern that may be visible by multiple overhead cameras. In one embodiment, the body 502 is formed of carbon fiber and/or other material that has minimal change in dimensions due to changes in temperature.

FIG. 6 shows a photogrammetry target 600 having a body 602 with emitters (or artifacts) 604. The body 602 may be of any shape and size and include any number of emitters. In an embodiment, the emitters 604 include LEDs. The body 602 includes two or more emitters. In an embodiment, the body 602 has 5 emitters (e.g., 5 LEDs). The emitters 604 may be arranged in a row or linear pattern, or may be arranged in a non-linear pattern. Although shown in two planes extending parallel to top surfaces 606, 608 of the body 602, the emitters 604 may be in a same plane extending parallel to a top surface of the body 602 or may be in more than two planes extending parallel to more than two top surfaces. The emitters 604 may be arranged in various different patterns. In an embodiment, each of the emitters 604 has a ±60° conically-shaped emission pattern that may be visible by multiple overhead cameras. In one embodiment, the body 602 is formed of carbon fiber and/or other material that has minimal change in dimensions due to changes in temperature.

In the example shown, the body 602 includes a base portion 610 and a tapered portion 612 integrally formed with the base portion. Three of the emitters 604 are mounted on the base portion 610 and in a first plane extending parallel to first top surfaces 614. Two of the emitters 604 are mounted on the tapered portion 612 and in a second plane offset from the first plane and extending parallel to a second top surface 616. The tapered portion 612 has tapered sides 618 that extend from the surfaces 614 to the surface 616. Although the body 602 is shown being 'top-hat' shaped, the body 602 may be shapes differently than shown.

Figure 7:
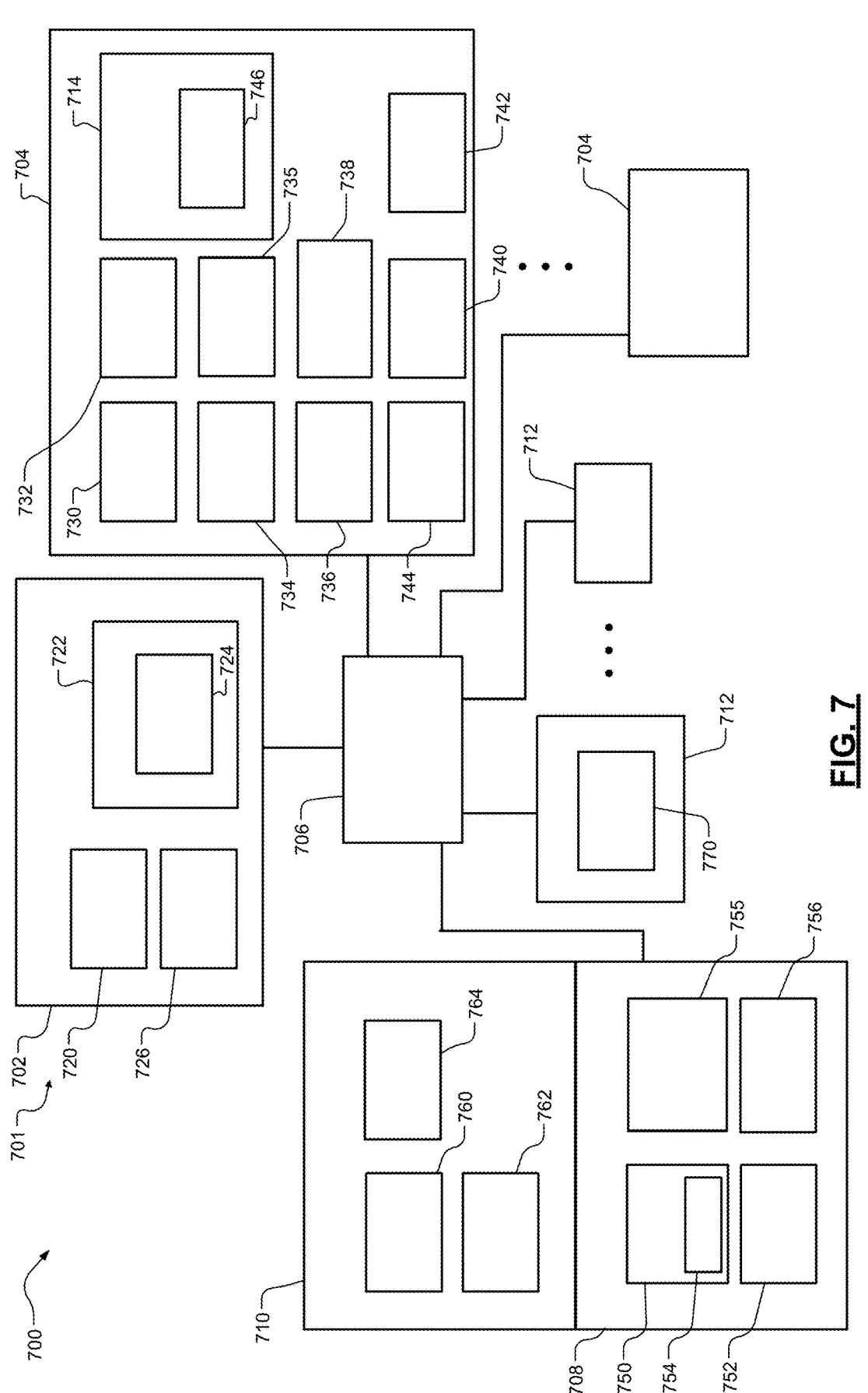
FIG. 7 is a functional block diagram of the manufacturing system of FIG. 1

The targets 500, 600 of FIGS. 5-6 and the other similar targets of FIGS. 1-3 may receive power from the corresponding robots (e.g., the robots 112, 114 of FIGS. 1-3) and/or from one or more system control modules, such as that shown in FIG. 7. The LEDs may be constantly on during a manufacturing process or may be turned on and off at predetermined frequencies and/or have corresponding duty cycles. The one or more system control modules may select the frequencies, duty cycles, intensities, etc. of the emitters of the targets. As an example, the emitters of the stability targets and photogrammetry targets may each have a respective color, frequency, duty cycle, intensity, and/or other distinguishing parameter as compared to the other ones of the stability targets and photogrammetry targets. In an embodiment, the emitters of the targets have a same color and are on continuously during a manufacturing process (e.g., a cutting process to form one or more features of a workpiece).

FIG. 7 shows a manufacturing system 700 including: an overhead photogrammetry guidance system 701 including a support stand 702; working and inspection robots 704; one or more system control modules 706; a cart 708 on which a workpiece 710 is mounted; stability targets 712; and photogrammetry targets 714 mounted on the robots 704. The manufacturing system 700 may be configured similarly as the manufacturing system 102 of FIGS. 1-3. The support stand 702 may be configured similarly as one of the support stands 110 and 400 of FIGS. 1-4. The support stand 702 may include overhead cameras 720, camera actuators 722 including motors 724, and one or more reference coordinate frames 726 associated with a first coordinate system of the corresponding overhead photogrammetry guidance system.

The robots 704 may each include joint motors 730, links 732, joints 734, a head 735, one or more reference coordinate frames 736 associated with a second coordinate system, one or more tools and/or cameras 738, a base 740, a rail motor 742, and a robot control module 744. The joint motors 730 are located at the joints 734 and move the links 732 to move the head 735. The joint motors 730 are controlled by the robot control module 744. The one or more tools and/or cameras 738 are mounted on the head 735. A first one of the links 732 is connected to the base 740, which moves along rails (e.g., rails of one of the rail sets 116 of FIG. 1). The rail motor 742 may move the base 740 relative to the rails. As an alternative, a motor separate from one of the robots 704 may be used to, for example, turn a ball screw in a rail assembly that includes the rails to move the robot relative to the rails.

Each of the robots 704 includes one or more photogrammetry targets 714, which may include emitters 746. In one embodiment, each of the photogrammetry targets 714 is configured similarly as the photogrammetry target 600 of FIG. 6. Each of the robots 704 may include any number of photogrammetry targets 714.

The cart 708 may include a trunnion system 750, a workpiece stand 752 and one or more reference coordinate frames associated with a third coordinate system. The workpiece stand 752 holds the workpiece 710. The trunnion system 750 may include a motor 754 for rotating the workpiece 710 on the workpiece stand 752. The cart 708 may also include one or more translation motors 756 to move the cart 708 relative to the support stand 702.

The workpiece 710 may include datums 760, features 762 and one or more reference coordinate frames 764 associated with the third coordinate system. The datums 760 may include holes, slots, and/or other reference points and/or items of the workpiece 710. The features 762 refer to items of the workpiece 710 that are worked on, such as holes, slots, fasteners, weld joints, grooves, channels, etc.

Each of the stability targets 712 may include emitters, such as emitters 770. In an embodiment, the stability targets 712 are each configured similarly as the stability target 500 of FIG. 5.

The one or more system control modules 706 may control the overhead cameras 720, the motors 724, the joint motors, the tools and/or cameras 738, the rail motor 742, the robot control module 744, the emitters 746, the motors 754, and the emitters 770. The one or more system control modules 706 coordinate timing, positioning, locations, on and off times, frequencies, duty cycles, intensities, speeds, etc. of these items. The positioning and/or locations may be determined relative to the coordinate systems. Locations determined relative to the second and third coordinate systems may be converted or related to the first coordinate system, which may be referred to as the overall cell (or main) coordinate system of the corresponding cell. The reference coordinate frames 726, 736, 755, 764 may refer to reference points on the support stand 702, the robots 704, the cart 708 and the workpiece 710. The reference coordinate frames 726, 736, 755, 764 may be used to determine locations of the head 735, tools and/or cameras 738, and features 762 and/or corresponding surfaces of the workpiece 710 relative to the support stand 702, the cart 708, the overhead cameras 720, the stability targets 712, the photogrammetry targets 714, and/or other items in the cell. One or more of the reference coordinate frames 726, 736, 755, 764 may be virtual reference coordinate frames. As an example, one of the reference coordinate frames 726 may be a virtual reference coordinate frame and a location of the workpiece 710 and portions thereof may be determined relative to the virtual reference coordinate frame. This may include X, Y, Z, roll, pitch and yaw values for each datum of the workpiece. A best fit approach may be used to align the workpiece to the first (or overall cell) coordinate system.

The reference coordinate frames 726, 736, 755, 764 may be placed anywhere in the cell and on the above-stated items. One of the reference coordinate frames 764 may be located at a front of the workpiece 710. Each of the reference coordinate frames 726, 736, 755, 764 may have an x-axis pointing horizontally from front to rear of the cell, a y-axis pointing laterally across the cell perpendicular to the x-axis, and a z-axis pointing vertically and perpendicular to the x and y axes.

A control module is configured to determine a 6 degree of freedom pose (DOF) of the workpiece 710 and target locations where holes are to be cut in the workpiece 710 based on data from the inspection robots and the locations of the identifiers.

In an embodiment, one or more cutting (or working) robots have identifiers on or near end effectors of the cutting robot(s). The control module determines the position(s) of the end effector(s) based on the identifiers. This allows the position(s) of the end effector(s) to be accurately determined and controlled by the control module to cut the holes in the corresponding workpiece (e.g., vehicle frame) at the target locations. This provides for manufacturing flexibility and quality for producing medium to low volume workpieces to be processed using the inspection and cutting station.

The locations of the overhead cameras 720, the stability targets 712 and the photogrammetry targets 714 is flexible. The positions of the photogrammetry targets 714 and stability targets 712 can change to provide lines-of-sight between datums 760 and the measurement robot cameras (or inspection cameras) 738, and to provide lines-of-sight between i) emitters of the photogrammetry targets 714 and the stability targets 712, and ii) the overhead cameras 720. In one embodiment, the overhead cameras 720 include 6-8 cameras. The cameras include top mounted cameras and hanging (or end) cameras. Top mounted meaning connected to a top crossbar. The top mounted cameras may be mounted above, vertically even with, or below the crossbar.

Figure 8:
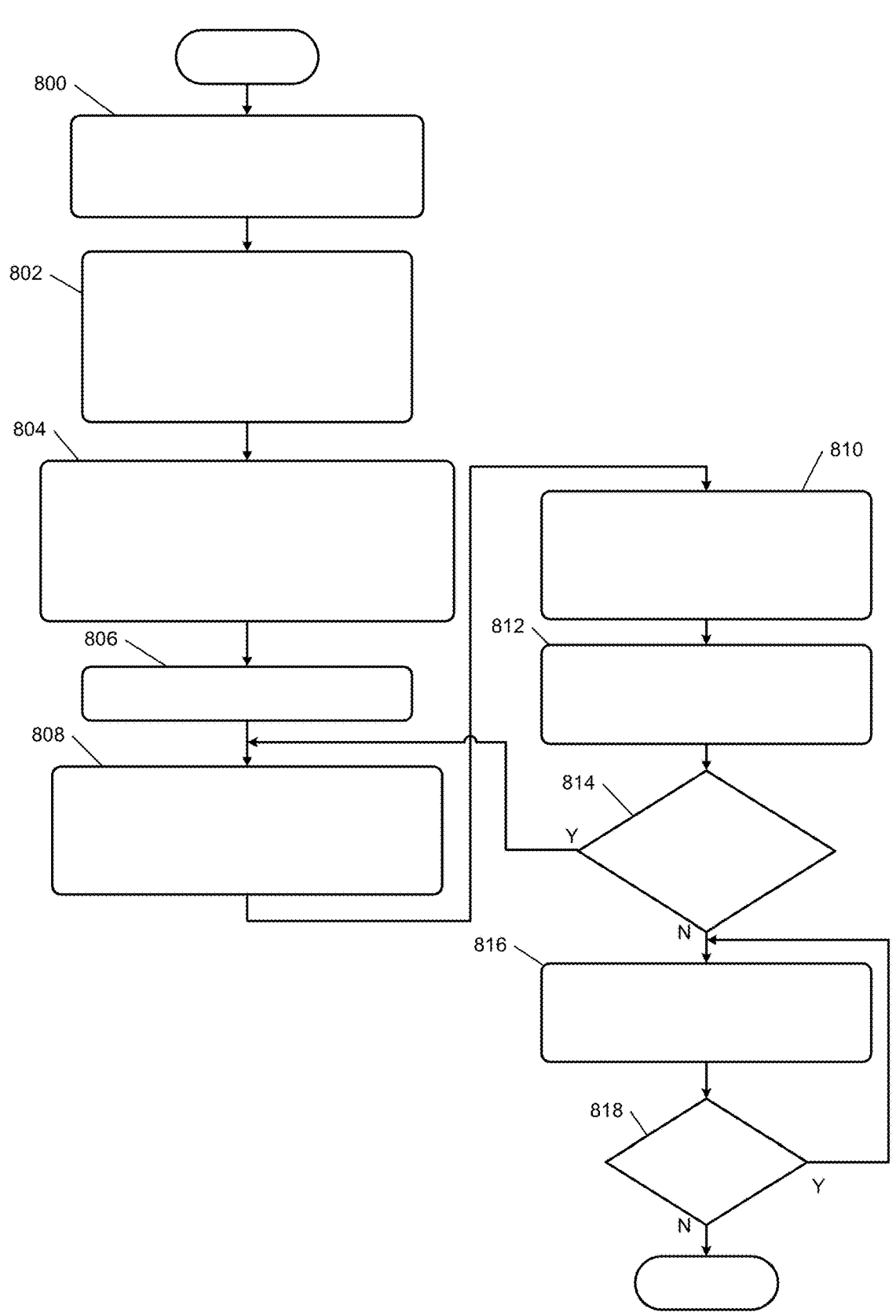
FIG. 8 illustrates a manufacturing method in accordance with the present disclosure.

FIG. 8 shows a manufacturing method. Although the method is primarily described with respect to the manufacturing system of FIG. 7, the method is applicable to the manufacturing system of FIGS. 1-3.

Figure 9:
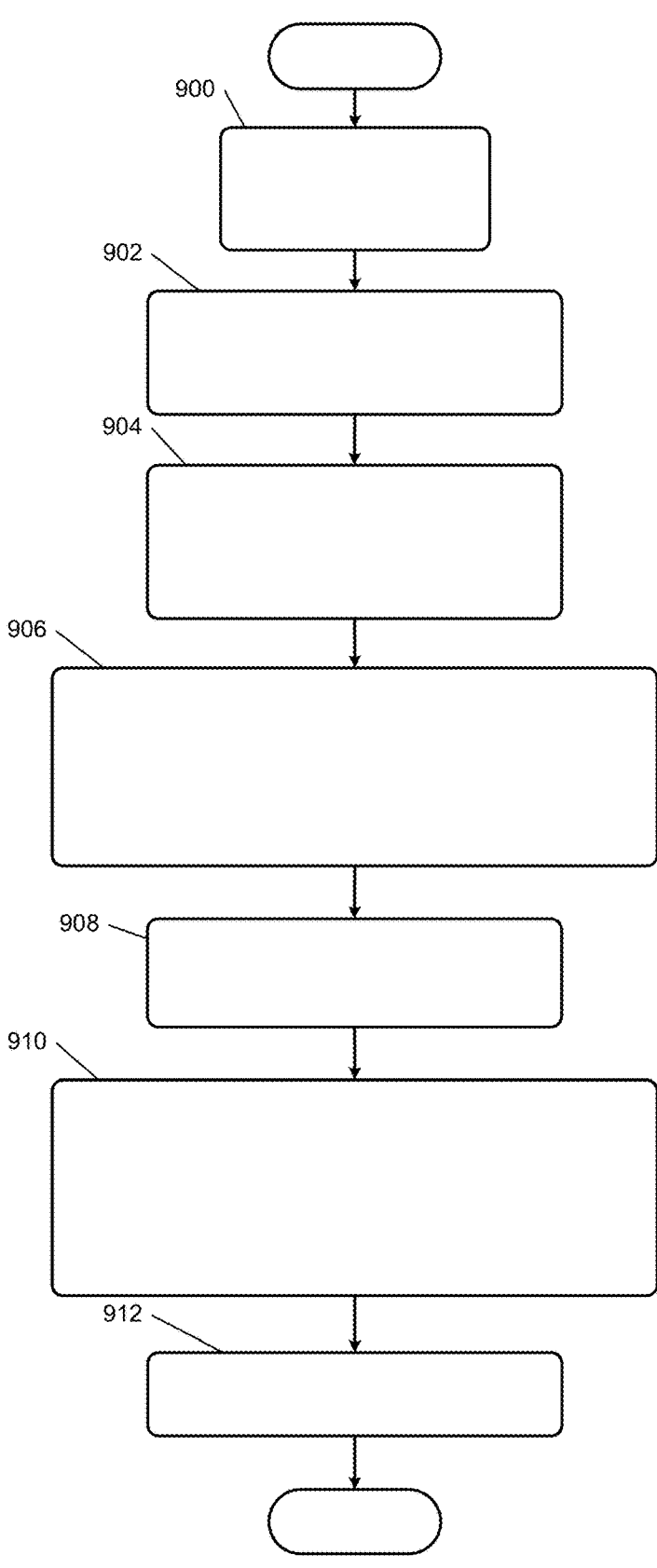
FIG. 9 illustrates a method of designing a photogrammetry guidance system in accordance with the present disclosure.

At 800, the one or more control modules 706 or other control modules design an overhead photogrammetry guidance system (e.g., the overhead photogrammetry guidance system 104 of FIGS. 1-3 or the overhead photogrammetry guidance system 701 of FIG. 7). A design method is shown in FIG. 9, which may be implemented as part of operation 800. The design method includes determining i) dimensions of an overhead structure for overhead cameras and/or dimensions of a support stand (e.g., the support stand 110, 702 of FIGS. 1 and 7), and ii) the number and locations of stability targets. As an example, the cell may be 15-20 feet long, by 10-15 feet wide, by 10-25 tall to accommodate a workpiece that is 10-15 feet long, by 5-8 feet wide, by 1-3 feet tall. The dimensions of the overhead structure and the number and locations of the stability targets are used to build the overhead photogrammetry guidance system. The overhead photogrammetry guidance system includes a support stand, overhead cameras and the one or more control modules 706.

At 802, the one or more control modules 706 calibrates the one or more control modules 706 based on at least one reference coordinate frame and detected locations of stability targets to determine locations of the overhead cameras in the cell. The at least one reference coordinate frame may include the reference coordinate frame 736.

At 804, the one or more control modules 706 calibrates working and inspection robots based on at least one reference coordinate frame using the overhead cameras to determine locations of the photogrammetry targets of the robots relative to the overhead cameras. Emission patterns of the emitters of the targets are detected and may be compared to known patterns for the targets to determine locations and/or orientations of the targets. The at least one reference coordinate frame may include the reference coordinate frame 736.

At 806, a workpiece is moved into the cell. This may be done manually or by the one or more control modules 706.

At 808, the one or more control modules 706 orients workpiece if not in proper orientation for first (or next) features and determine locations of datums on the workpiece to determine a location of the workpiece relative to one or more coordinate systems, the robots, and the overhead cameras. The coordinate systems may include any of the first, second and third coordinate systems of the support stand, the robots, and the cart. At the start of a process and after each new re-orientation of the workpiece, locations of the datum are measured. The datums are captured using the overhead photogrammetry guidance system to determine an accurate (six DOF pose) of the workpiece relative to the reference coordinate frames. This is referred to as datum alignment in which the workpiece location is mapped into the overhead photogrammetry guidance system. The overhead photogrammetry guidance system determines offsets of the robots to accurately locate features.

At 810, the one or more control modules 706 guide tools on one or more working robots to one or more surfaces of workpiece to be worked on. Prior to forming and/or working on a feature, locations of the surfaces are measured. The heads of the working robots may be coarsely moved to be close to locations (pre-positions) of features to be worked on and then the overhead photogrammetry guidance system may be used to precisely locate working ends or tips of the tools on the workpiece. The precise locating of the ends or tips may be within ±1 mm or less of target locations.

At 812, the one or more control modules 706 work on the workpiece including optionally guiding the tools on the one or more working robots to create one or more features on the workpiece.

Each pre-position is the position where the robot stops just prior to working on the workpiece (e.g., cutting with a torch or measuring with a camera). A pre-position is close to an actual starting position for the working (e.g., cutting or measuring) operation. The pre-position is far enough away from the workpiece such that there is no collision with the workpiece. Once in the pre-position, the one or more control modules 706 determine and/or calculate the location of the tool or camera on the head of the robot. Based on this information, the one or more control modules 706 determines X, Y, Z, pitch, yaw, roll offset to correct the robot position and improve accuracy. The working position or measurement position, depending on whether the robot is moving a tool or camera, is the corrected position where the working (e.g., cutting) or measuring should start or end. The working and measurement positions are specific for each feature and for each frame. The working and measurement positions are determined based on i) actual measurements of datums of the workpiece, and ii) measurements of the feature surfaces (e.g., hole surfaces) that are to be made (e.g., cut) with the tool.

At 814, the one or more control modules 706 determines whether there is another feature to create and/or surface to be worked on. If yes, operation 808 is performed, otherwise operation 816 is performed.

At 816, the one or more control modules 706 guides cameras of one of more inspecting robots to locations of features and inspect the features via the inspecting robot cameras. The features are measured. The dimensions and locations of the features are measured.

At 818, the one or more control modules 706 determines whether there is another feature to inspect. If yes, operation 816 is performed, otherwise the method may end.

FIG. 9 shows a method of designing a photogrammetry guidance system. At 900, the one or more control modules 706 define a workpiece family including dimensions of workpieces of the family to be worked on. A family of workpieces may refer to multiple different workpieces having different sizes, shapes, characteristics, etc. The workpieces of a particular family may be of a same type and/or model but have different dimensions and/or number of features. In an embodiment and when the part family is, for example, a truck frame family, maximum length, width and height dimensions of the workpieces are defined.

At 902, the one or more control modules 706 determines feature locations and workpiece orientations for the feature locations for variants in the workpiece family. This may be based on the dimensions of the workpieces. As an example, the feature locations may refer to locations on a workpiece where the features are to be located. In an embodiment and for a workpiece family that includes truck frames, cutting locations and orientations tools for the cutting locations are determined for the variant truck frames of the family.

At 904, the one or more control modules 706 determine locations of tools of working robots and corresponding photogrammetry targets at each pre-position and while in each active working tool position. In an embodiment and for a workpiece family that includes truck frames, each pre-position and each cutting position of each tool for each workpiece of the workpiece family is determined. This is done for each feature of each of the workpieces to be worked on and is based on the locations of the features. The working positions are determined based on i) actual measurements of datums of the workpiece, and ii) measurements of the feature surfaces (e.g., hole surfaces) that are to be made (e.g., cut) with the tool.

At 906, the one or more control modules 706 determine locations of photogrammetry targets on measurement robots to determine locations of measurement robot cameras at each pre-position and at each measurement position for datums, features worked on and measured, and features measured but not worked on. The pre-positions and measurement positions may be of datums of the workpieces of the workpiece family, features worked on, and features not worked on. In an embodiment and for a workpiece family that includes truck frames, each location of robot cameras (used for inspection) and associated photogrammetry targets at each pre-position and while in each measurement position are determined including locations of datums, cutting features, and features that are measured only.

At 908, the one or more control modules 706 determines i) the number of photogrammetry cameras, and ii) the photogrammetry camera locations and orientations. This is done such that each of the photogrammetry target locations and orientations are visible and within acceptable FOVs of at least two overhead cameras during an entire manufacturing process of forming and/or working on features for a workpiece of the particular family of concern. At least a portion of a photogrammetry target having a predefined pattern of emitters (e.g., two or more emitters) is visible by at least two of the overhead cameras at any moment in time in the manufacturing process. In an embodiment, 2-5 emitters are visible by at least two overhead cameras during the manufacturing process. The number of overhead cameras and corresponding locations may be based on first parameters, such as the dimensions of the workpieces, the locations of the features, the locations of the photogrammetry targets, and the locations of the measurement robot cameras.

At 910, the one or more control modules 706 determines dimensions of overhead structure and/or support stand to hold overhead cameras in locations defined based on information determined in above operations. The dimensions of the overhead structure and/or support stand may be determined based on second parameters such as the locations of the photogrammetry targets, the locations of the measurement robot cameras, the number of overhead cameras, the locations and orientations of the overhead cameras, number of photogrammetry cameras, and locations of the photogrammetry cameras.

At 912, the one or more control modules 706 determine number and locations of stability targets. This may be determined such that each photogrammetry camera is able to see at least two stability targets. The number and locations of the stability targets are determined such that at least a portion of the stability targets having a predefined pattern of emitters are visible by at least two of the overhead cameras at any moment during the manufacturing process. The number of stability targets and locations of the stability targets may be determined based on third parameters such as the number of overhead cameras and the locations of the overhead cameras.

Subsequent to performing the method of FIG. 9, several of the parameters determined during the method of FIG. 9 may be used during the method of FIG. 8. These parameters include: the working locations of the tools during use, which may remain the same as long as the type and model of the workpiece remains the same; the locations of the robot cameras, which remains the same as long as the type and model of the workpiece remains the same; the geometry of the overhead structure supporting the overhead cameras, which remains the same; the locations and orientations of the photogrammetry cameras, which remain fixed during manufacturing of workpieces until the workpiece family changes; and the location of the stability targets (or artifacts), which remains constant as long as the locations of the overhead photogrammetry cameras are not changed.

The above-described examples include design and use of an overhead photogrammetry guidance system that provides precise positioning of robot heads for precise positioning of corresponding working tools and inspection cameras mounted on the robot heads. The heads or last links of the robots have the tools and inspection cameras to provide accurate guidance and positioning. The inspection cameras are used for quality inspections. Each cell includes an overhead photogrammetry structure supporting multiple cameras providing a vision system providing feedback based on which the tools and inspection cameras are able to be precisely placed and precisely moved. The examples disclosed herein are applicable for frame cutting applications and other applications.

The above-described examples provide an overhead photogrammetry guidance system that includes a minimum number of overhead cameras and targets to accurately determine a location of a workpiece in a cell and locations of datums and features of the workpiece in the cell. A minimum number of targets are included for real time precise location determination of tools and cameras on heads of robots and for guiding movement of the tools and cameras. This is based on the accurate detection of the locations of the datums prior to the guided movement. The inclusion of a minimum number of overhead cameras, targets and inspection cameras allow for high-speed detection and mapping of locations of workpieces and portions thereof in a cell and inspection of features of the workpieces. The locations are 6 DOF locations within the cell. The tools and cameras mounted on the heads may be moved to nominal locations based on dimensions and locations of surfaces of the workpieces relative to the overall coordinate system of the cell. The examples are flexible for different products (or workpieces) by adjusting locations, orientations and/or number of overhead cameras. The examples are fixtureless such that the workpieces are not held by workpiece specific fixtures but rather are held by a cart, which is able to hold different types and models of workpieces.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A manufacturing system comprising:
a plurality of stability targets;
a set of rails;
a plurality of robots comprising a plurality of photogrammetry targets mounted respectively on heads of the plurality of robots, the plurality of robots configured to move along the set of rails, and each of the plurality of robots comprising a plasma cutting tool and a camera mounted on a respective one of the heads; and
a photogrammetry system comprising
a support stand,
a plurality of overhead cameras mounted on the support stand above the plurality of robots and a workpiece to be worked on by at least one of the plurality of robots, and
at least one control module configured to
via the plurality of overhead cameras, determine locations of the plurality of stability targets and locations of the plurality of photogrammetry targets,
based on the locations of the plurality of stability targets and locations of the plurality of photogrammetry targets, determine locations of the plurality of overhead cameras and locations of the heads of the plurality of robots, and
control the plurality of robots to create and inspect at least one feature of the workpiece based on the locations of the plurality of overhead cameras and the locations of the heads of the plurality of robots.

2. The manufacturing system of claim 1, wherein the plurality of robots comprise:

at least one working robot configured to form or work on the at least one feature; and
at least one measurement robot configured to inspect the at least one feature.

3. The manufacturing system of claim 1, wherein each of the plurality of stability targets is in field-of-views of at least two of the plurality of overhead cameras.

4. The manufacturing system of claim 1, wherein each of the plurality of photogrammetry targets is in field-of-views of at least two of the plurality of overhead cameras.

5. The manufacturing system of claim 1, wherein at least two emitters of each of the plurality of stability targets is in field-of-views of at least two of the plurality of overhead cameras.

6. The manufacturing system of claim 1, wherein at least one of:
emitters of at least one of the plurality of photogrammetry targets is in field-of-views of at least two of the plurality of overhead cameras; and
at least two emitters of each of the plurality of photogrammetry targets is in field-of-views of at least two of the plurality of overhead cameras.

7. The manufacturing system of claim 1, wherein each feature of the workpiece to be at least one of worked on or inspected is within a predetermined range of two of the plurality of overhead cameras.

8. The manufacturing system of claim 1, wherein an intersection angle of each of the plurality of stability targets and each of the plurality of photogrammetry targets with respect to at least two of the plurality of overhead cameras is within a predetermined range.

9. The manufacturing system of claim 1, wherein the at least one control module is configured to determine locations of the plurality of stability targets and locations of the plurality of photogrammetry targets based on one or more reference coordinate frames.

10. The manufacturing system of claim 1, wherein the at least one control module is configured to determine locations of the plurality of overhead cameras and locations of the heads of the plurality of robots based on one or more reference coordinate frames.

11. A manufacturing system design method comprising:
defining a workpiece family including dimensions of workpieces of the workpiece family to be worked on;
determining feature locations and workpiece orientations for features of the workpieces to be created or worked on based on the dimensions of the workpieces;
based on the feature locations, determining locations of a plasma cutting tool of a working robot and corresponding first photogrammetry target at each pre-position of the plasma cutting tool and while in each active working position of the plasma cutting tool associated with creating or working on the features;
determining locations of a second photogrammetry target on a measurement robot to determine locations of a measurement robot camera at each pre-position and at each measurement position of the features;
determining number of overhead cameras of an overhead photogrammetry guidance system and locations of the overhead cameras based on a first plurality of parameters;
determining dimensions of an overhead structure holding the overhead cameras based on a second plurality of parameters;
determining a number of stability targets and locations of the stability targets based on a third plurality of parameters; and create and inspect at least one of the features on one of the workpieces based on i) the locations of the plasma cutting tool, ii) the locations of the measurement robot cameras, iii) the dimensions of the overhead structure, iv) the locations and orientations of the overhead cameras, and v) the locations of the stability targets.

12. The method of claim 11, wherein the determining of the locations of the measurement robot camera at each pre-position and at each measurement position comprises determining each pre-position and each measurement position of i) datums of the workpieces, ii) ones of the features worked on and measured, and iii) ones of the features measured but not worked on.

13. The method of claim 11, wherein the first plurality of parameters comprise i) the dimensions of the workpieces, ii) the feature locations, iii) the locations of the first photogrammetry target, iv) the second photogrammetry target, and v) the locations of the measurement robot camera.

14. The method of claim 11, wherein the second plurality of parameters comprise i) the locations of the first photogrammetry target and the second photogrammetry target, ii) the locations of the measurement robot camera, iii) the number of the overhead cameras, and iv) the locations and orientations of the overhead cameras.

15. The method of claim 11, wherein the third plurality of parameters comprise i) the number of the overhead cameras, and ii) the locations of the overhead cameras.

16. The method of claim 11, wherein the at least one of working on and inspecting the features of the one of the workpieces comprises:

calibrating the overhead photogrammetry guidance system;

calibrating the working robot and the measurement robot;

moving one of the workpieces into a cell having the overhead photogrammetry guidance system to create or work on the features of the one of the workpieces;

orienting the one of the workpieces and determining locations of datums of the one of the workpieces;

guiding the plasma cutting tool to work on features of the one of the workpieces; and guiding the measurement robot camera to inspect the features on the one of the workpieces.

17. The method of claim 16, wherein the calibrating of the overhead photogrammetry guidance system comprises determining locations of the overhead cameras relative to the stability targets.

18. The method of claim 11, wherein the calibrating of the working robot and the measurement robot comprises determining locations of the first photogrammetry target and the second photogrammetry target relative to the overhead cameras.

19. The method of claim 11, wherein the plasma cutting tool is guided based on known locations of the first photogrammetry target relative to the overhead cameras.

20. The method of claim 11, wherein the measurement robot camera is guided based on known locations of the second photogrammetry target relative to the overhead cameras.

\* \* \* \* \*